(12) United States Patent
Wu et al.

(10) Patent No.: US 11,503,571 B2
(45) Date of Patent: Nov. 15, 2022

(54) GRANT-FREE RESOURCE ALLOCATION

(71) Applicant: Lenovo (Beijing) Limited, Beijing (CN)

(72) Inventors: Lianhai Wu, Beijing (CN); Haipeng Lei, Beijing (CN); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 117 days.

(21) Appl. No.: 16/636,594

(22) PCT Filed: Aug. 4, 2017

(86) PCT No.: PCT/CN2017/096033
§ 371 (c)(1),
(2) Date: Feb. 4, 2020

(87) PCT Pub. No.: WO2019/024089
PCT Pub. Date: Feb. 7, 2019

(65) Prior Publication Data
US 2021/0160841 A1    May 27, 2021

(51) Int. Cl.
*H04W 72/04* (2009.01)
*H04W 74/08* (2009.01)
(52) U.S. Cl.
CPC ..... *H04W 72/0406* (2013.01); *H04W 72/042* (2013.01); *H04W 74/08* (2013.01)
(58) Field of Classification Search
CPC ......... H04W 72/0413; H04W 72/0406; H04W 72/042; H04W 74/08
See application file for complete search history.

(56) References Cited

U.S. PATENT DOCUMENTS

| | | | |
|---|---|---|---|
| 2014/0269338 A1* | 9/2014 | Jung | H04L 5/0055 370/329 |
| 2016/0366618 A1 | 12/2016 | Quan et al. | |
| 2017/0034845 A1* | 2/2017 | Liu | H04W 72/1268 |
| 2017/0288817 A1* | 10/2017 | Cao | H04L 1/1845 |
| 2017/0367116 A1* | 12/2017 | Li | H04W 72/048 |
| 2018/0035459 A1* | 2/2018 | Islam | H04L 1/1887 |
| 2018/0206246 A1* | 7/2018 | Zhang | H04L 1/00 |

(Continued)

FOREIGN PATENT DOCUMENTS

| | | |
|---|---|---|
| CN | 105636211 A | 6/2016 |
| CN | 106507497 A | 3/2017 |

(Continued)

OTHER PUBLICATIONS

European Patent Office, "The Extended European Search Report", dated Nov. 30, 2020, pp. 1-12.

(Continued)

*Primary Examiner* — Oussama Roudani
(74) *Attorney, Agent, or Firm* — Kunzler Bean & Adamson (57) ABSTRACT

Apparatuses, methods, and systems are disclosed for grant-free resource allocation. One apparatus (200) includes a transmitter (210) that transmits (602) assistant information to a base unit (104) to assist in grant-free resource allocation. In such an apparatus, the assistant information may include an expected type of resource, a bit rate requirement, reliability information, or some combination thereof.

16 Claims, 7 Drawing Sheets

(56) References Cited

U.S. PATENT DOCUMENTS

2018/0367255 A1* 12/2018 Jeon .................. H04L 5/0053
2019/0320446 A1* 10/2019 Li .................... H04W 72/1284
2020/0008179 A1* 1/2020 Lee .................. H04L 5/0092

FOREIGN PATENT DOCUMENTS

| CN | 106658718 A | 5/2017 |
|---|---|---|
| WO | 2017021773 A1 | 2/2017 |

OTHER PUBLICATIONS

Nokia, Alcatel-Lucent Shanghai Bell, "Nokia, Alcatel-Lucent Shanghai Bell", 3GPP TSG-RAN WG1 #86bis R1-1609652, Oct. 10-14, 2016, pp. 1-3.

Lenovo, Motorola Mobility, "Discussion of procedures for UL transmission with and without grant", 3GPP TSG RAN WG1 Meeting #89 R1-1707766, May 15-19, 2017, pp. 1-4.

Lenovo, Motorola Mobility, "Enhanced SR carried in UL control channel", 3GPP TSG RAN WG1 NR Ad-Hoc#2 R1-1710597, Jun. 27-30, 2017, pp. 1-3.

PCT/CN2017/096033, "Notification of Transmittal of the International Search Report and the Written Opinion of the International Searching Authority, or the Declaration", PCT, dated May 7, 2018, pp. 1-9.

\* cited by examiner

GRANT-FREE RESOURCE ALLOCATION

FIELD

The subject matter disclosed herein relates generally to wireless communications and more particularly relates to grant-free resource allocation.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, resource allocation may be different for different configurations. In such networks, resource allocation may not be performed in the best manner.

BRIEF SUMMARY

Apparatuses for grant-free resource allocation are disclosed. Methods and systems also perform the functions of the apparatus. In one embodiment, the apparatus includes a transmitter that transmits assistant information to a base unit to assist in grant-free resource allocation.

In one embodiment, the assistant information includes an expected type of resource, a bit rate requirement, reliability information, or some combination thereof. In a further embodiment, the expected type of resource, the bit rate requirement, the reliability information, or some combination thereof is based on an amount of traffic in a cellular network. In certain embodiments, the expected type of resource, the bit rate requirement, the reliability information, or some combination thereof is based on a remote unit.

In various embodiments, the expected type of resource is selected from the group including: a first resource type in which uplink data transmissions are made based on radio resource control signaling, without grant, and without physical layer signaling; a second resource type in which uplink data transmissions are made based on radio resource control signaling, without grant, and with physical layer signaling for activation, deactivation, or a combination thereof; and a third resource type in which uplink data transmissions are made based on radio resource control signaling, without grant, and with physical layer signaling for modifying at least one parameter. In some embodiments, the assistant information includes a delay, a bit rate requirement, reliability information, or some combination thereof. In one embodiment, the delay, the bit rate requirement, the reliability information, or some combination thereof is based on an amount of traffic in a cellular network. In a further embodiment, the delay, the bit rate requirement, the reliability information, or some combination thereof is based on a remote unit. In certain embodiments, the assistant information is based on an indicator transmitted from the base unit.

In various embodiments, the indicator indicates one or more types of grant-free transmissions supported by the base unit. In some embodiments, the indicator corresponds to all resource types. In one embodiment, the indicator corresponds to one resource type. In a further embodiment, the indicator is transmitted by radio resource control signaling.

In certain embodiments, the base unit configures the grant-free resource allocation based on features of a remote unit. In various embodiments, the transmitter transmits an indicator that indicates one or more types of grant-free transmissions supported by a remote unit. In some embodiments, the indicator corresponds to all resource types. In one embodiment, the indicator corresponds to one resource type. In certain embodiments, the indicator includes one bit and the one bit indicates whether the remote unit supports one or more types of grant-free transmissions.

A method for grant-free resource allocation, in one embodiment, includes transmitting assistant information to a base unit to assist in grant-free resource allocation.

In one embodiment, an apparatus for grant-free resource allocation includes a receiver that receives assistant information from a remote unit to assist in grant-free resource allocation.

In one embodiment, the assistant information includes an expected type of resource, a bit rate requirement, reliability information, or some combination thereof. In a further embodiment, the expected type of resource, the bit rate requirement, the reliability information, or some combination thereof is based on an amount of traffic in a cellular network. In certain embodiments, the expected type of resource, the bit rate requirement, the reliability information, or some combination thereof is based on a remote unit. In various embodiments, the expected type of resource is selected from the group including: a first resource type in which uplink data transmissions are made based on radio resource control signaling, without grant, and without physical layer signaling; a second resource type in which uplink data transmissions are made based on radio resource control signaling, without grant, and with physical layer signaling for activation, deactivation, or a combination thereof; and a third resource type in which uplink data transmissions are made based on radio resource control signaling, without grant, and with physical layer signaling for modifying at least one parameter. In some embodiments, the assistant information includes a delay, a bit rate requirement, reliability information, or some combination thereof. In one embodiment, the delay, the bit rate requirement, the reliability information, or some combination thereof is based on an amount of traffic in a cellular network.

In a further embodiment, the delay, the bit rate requirement, the reliability information, or some combination thereof is based on a remote unit. In certain embodiments, the assistant information is based on an indicator transmitted from a base unit. In various embodiments, the indicator indicates one or more types of grant-free transmissions supported by the base unit. In some embodiments, the indicator corresponds to all resource types. In some embodiments, the indicator corresponds to one resource type.

In certain embodiments, the indicator is transmitted by radio resource control signaling. In various embodiments, a base unit configures the grant-free resource allocation based on features of the remote unit. In some embodiments, the receiver receives an indicator that indicates one or more types of grant-free transmissions supported by the remote unit. In certain embodiments, the indicator corresponds to all resource types. In some embodiments, the indicator corresponds to one resource type. In various embodiments, the indicator includes one bit and the one bit indicates whether the remote unit supports one or more types of grant-free transmissions.

A method for grant-free resource allocation, in one embodiment, includes receiving assistant information from a remote unit to assist in grant-free resource allocation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
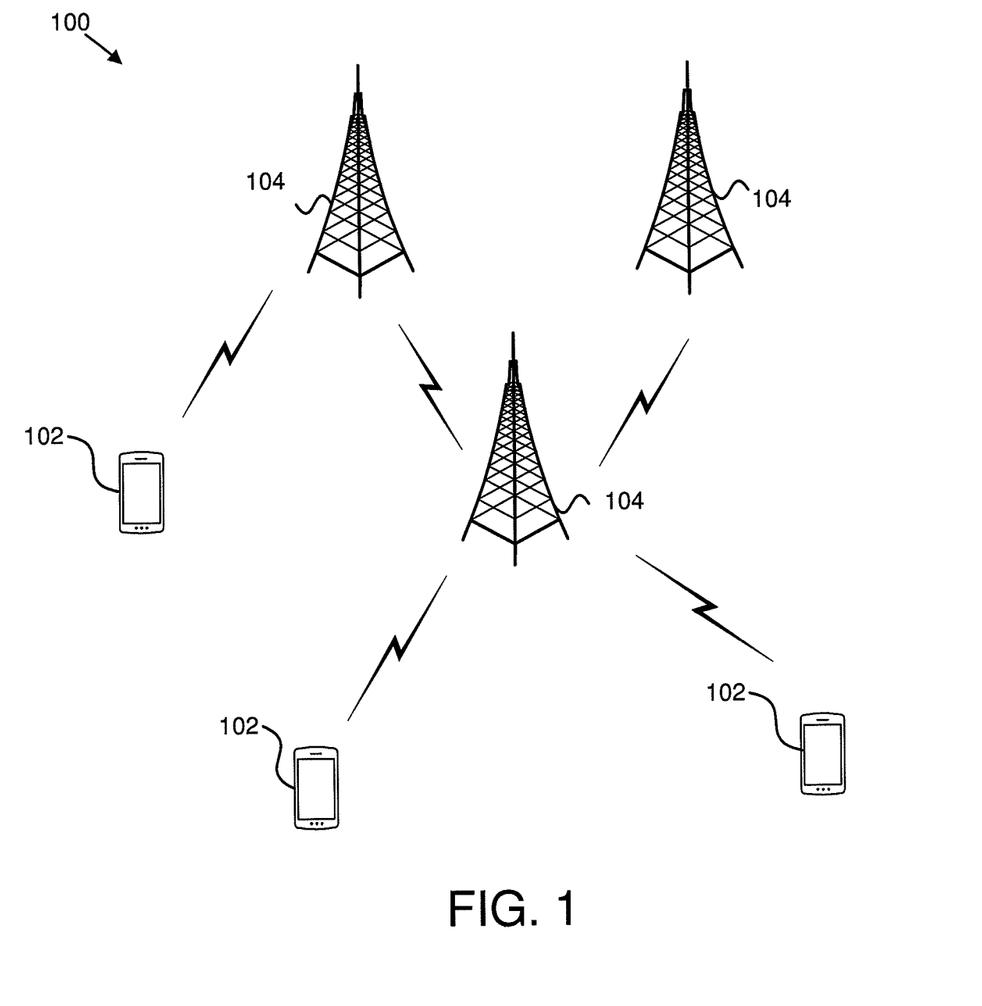
FIG. 1 is a schematic block diagram illustrating one embodiment of a wireless communication system for grant-free resource allocation.

FIG. 1 depicts an embodiment of a wireless communication system 100 for grant-free resource allocation. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may transmit assistant information to a base unit to assist in grant-free resource allocation. Accordingly, a remote unit 102 may be used for grant-free resource allocation.

In one embodiment, a base unit 104 may receive assistant information from a remote unit to assist in grant-free resource allocation. Accordingly, a base unit 104 may be used for grant-free resource allocation.

Figure 2:
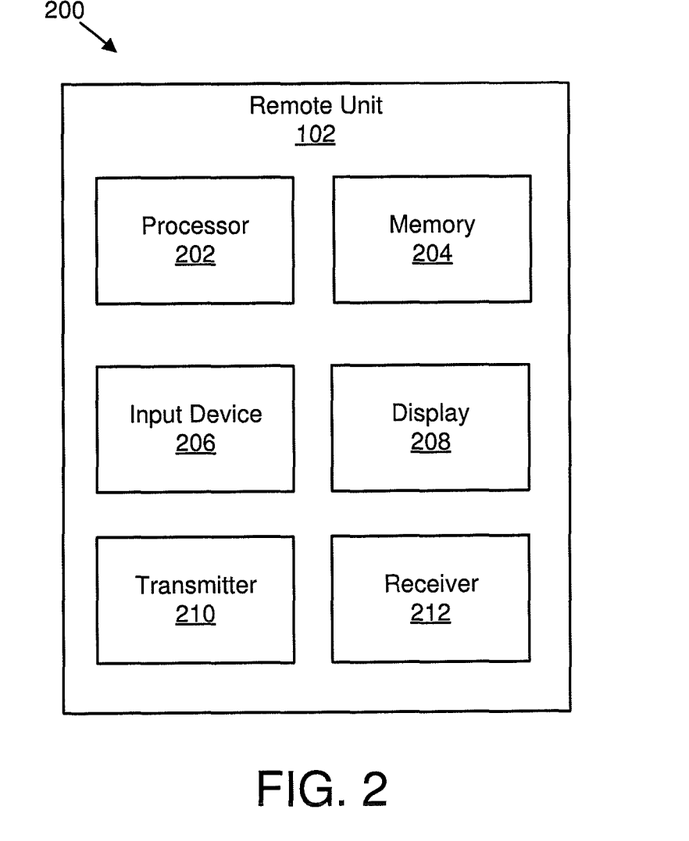
FIG. 2 is a schematic block diagram illustrating one embodiment of an apparatus that may be used for grant-free resource allocation.

FIG. 2 depicts one embodiment of an apparatus 200 that may be used for grant-free resource allocation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the transmitter 210 may be used to transmit assistant information to a base unit 104 to assist in grant-free resource allocation. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
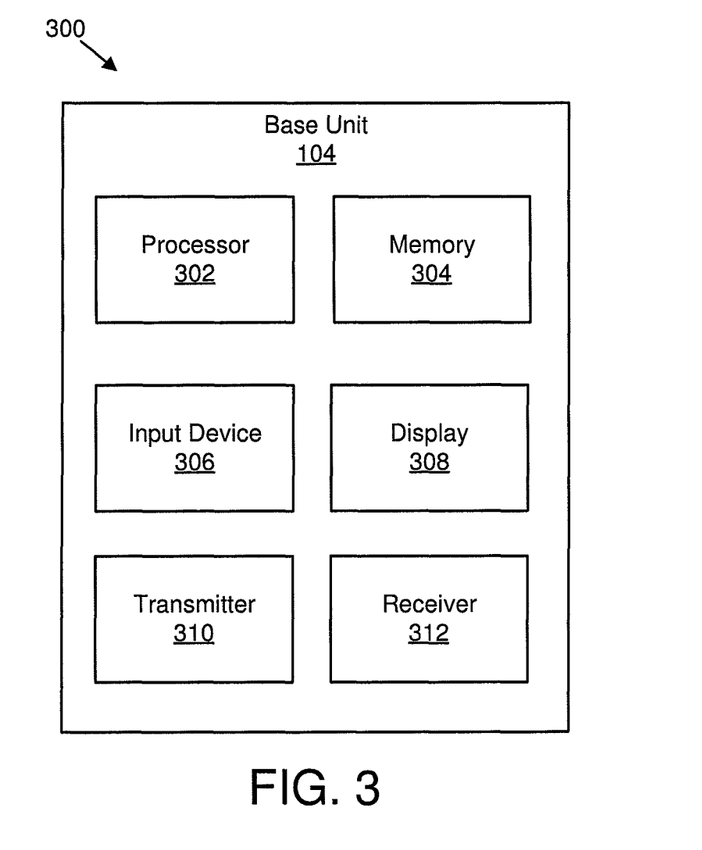
FIG. 3 is a schematic block diagram illustrating one embodiment of an apparatus that may be used for grant-free resource allocation.

FIG. 3 depicts one embodiment of an apparatus 300 that may be used for grant-free resource allocation. The apparatus 300 includes one embodiment of the base unit 104 and/or an aerial server. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive assistant information from a remote unit 102 to assist in grant-free resource allocation. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
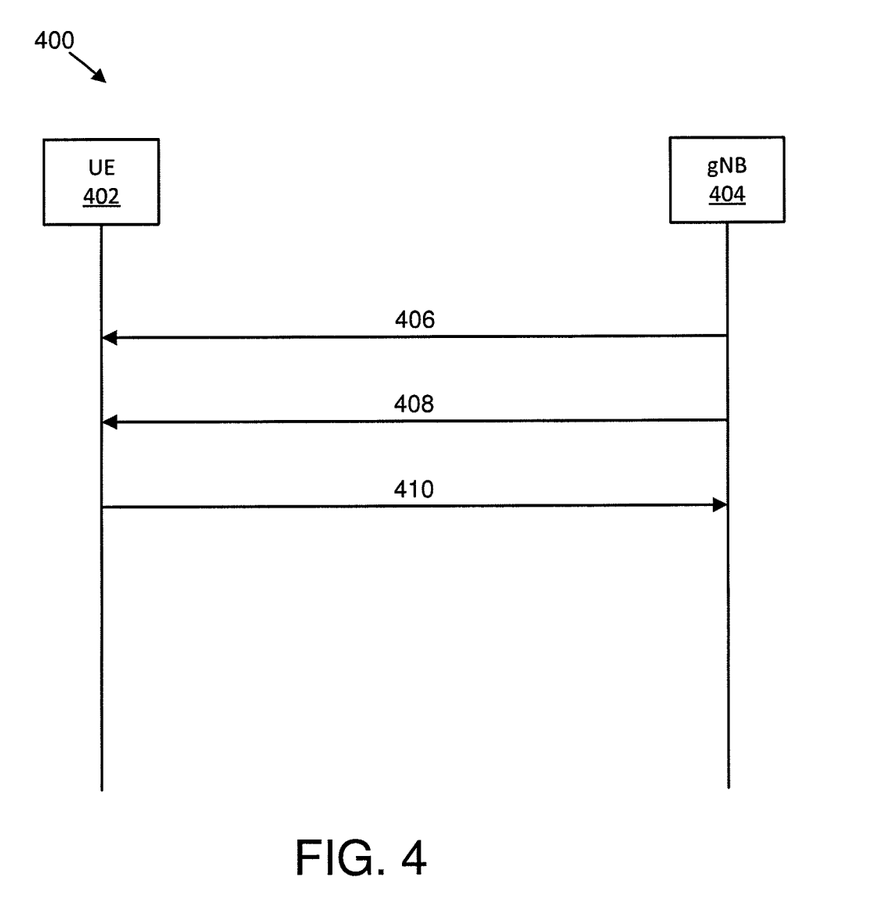
FIG. 4 is a schematic block diagram illustrating one embodiment of communications to facilitate grant-free resource allocation.

FIG. 4 is a schematic block diagram illustrating one embodiment of communications 400 to facilitate grant-free resource allocation. The communications 400 include communication between a UE 402 and a gNB 404.

Specifically, a first communication 406 may include a message transmitted from the gNB 404 to the UE 402. In one embodiment, in the first communication 406, the gNB 404 may inform the UE 402 about whether a grant-free feature is supported by the gNB 404. In such an embodiment, the gNB 404 may use broadcast signaling and/or dedicated signaling. For example, in one embodiment, the gNB 404 may use a one-bit indicator to indicate all grant-free types (or features). In such an embodiment, a "1" for the one-bit indicator may indicate that the gNB 404 supports all grant-free types (or features) and a "0" for the one-bit indicator may indicate that the gNB 404 does not support all grant-free types (or features). As another example, in one embodiment, the gNB 404 may use a one-bit indicator for each grant-free type (or feature). In such an embodiment, a "1" for the one-bit indicator may indicate that the gNB 404 supports a corresponding grant-free type (or feature) and a "0" for the one-bit indicator may indicate that the gNB 404 does not support the corresponding grant-free type (or feature).

A second communication 408 may include a message transmitted from the gNB 404 to the UE 402. In certain embodiments, the second communication 408 may include a request from the gNB 404 requesting that the UE 402 report the UE's capability.

A third communication 410 may include a message transmitted from the UE 402 to the gNB 404. In various embodiments, in the third communication 410, the UE 402 may transmit an indicator to the gNB 404 that provides an indication related to grant-free types (or features) supported by the UE 402. For example, in one embodiment, the UE 402 may use a one-bit indicator to indicate all grant-free types (or features). In such an embodiment, a "1" for the one-bit indicator may indicate that the UE 402 supports all grant-free types (or features) and a "0" for the one-bit indicator may indicate that the UE 402 does not support all grant-free types (or features). As another example, in one embodiment, the UE 402 may use a one-bit indicator for each grant-free type (or feature). In such an embodiment, a "1" for the one-bit indicator may indicate that the UE 402 supports a corresponding grant-free type (or feature) and a "0" for the one-bit indicator may indicate that the UE 402 does not support the corresponding grant-free type (or feature).

Figure 5:
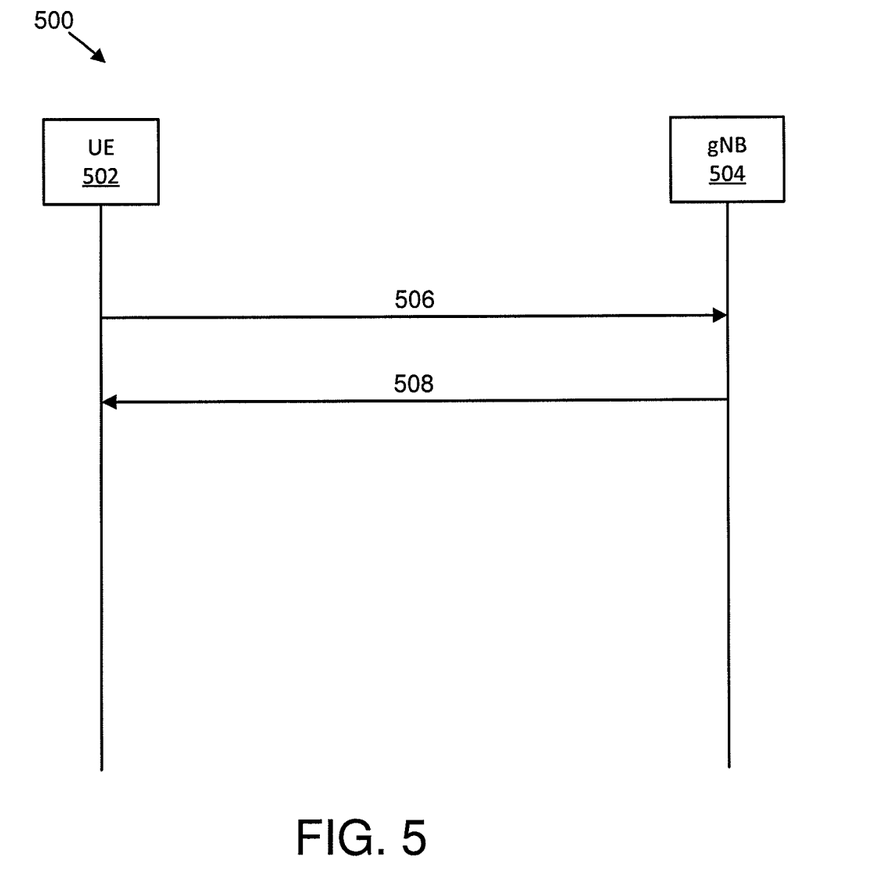
FIG. 5 is a schematic block diagram illustrating another embodiment of communications to facilitate grant-free resource allocation.

FIG. 5 is a schematic block diagram illustrating another embodiment of communications 500 to facilitate grant-free resource allocation. The communications 500 include communications between a UE 502 and a gNB 504.

Specifically, a first communication 506 may include a message transmitted from the UE 502 to the gNB 504. In one embodiment, in the first communication 506, the UE 502 may transmit a request of a grant-free resource configuration from the gNB 504. In certain embodiments, various assistant information may be included in the request. For example, the assistant information may include an expected type of resource (e.g., type 1, type 2, type 3), a bit rate requirement, and/or reliability information (e.g., reliability based on traffic). As another example, the assistant information may include a delay (e.g., an allowed delay), an expected bit rate, a bit rate requirement, and/or reliability information. As used herein, a first resource type may be a resource type in which uplink data transmissions are made based on radio resource control signaling, without grant, and without physical layer signaling. Moreover, as used herein, a second resource type may be a resource type in which uplink data transmissions are made based on radio resource control signaling, without grant, and with physical layer signaling for activation, deactivation, or a combination thereof. Furthermore, as used herein, a third resource type may be a resource type in which uplink data transmissions are made based on radio resource control signaling, without grant, and with physical layer signaling for modifying at least one parameter. In addition, as used herein, an expected type of resource may be a resource that a remote unit 102 would like to use (e.g., desired type of resource) and/or that the remote unit 102 anticipates using, but is dependent on corresponding transmissions being transmitted from a base unit 102.

A second communication 508 may include a message transmitted from the gNB 504 to the UE 502. In one embodiment, in the second communication 508, the gNB 504 may configure grant-free resource based on assistant information received from the UE 502.

Figure 6:
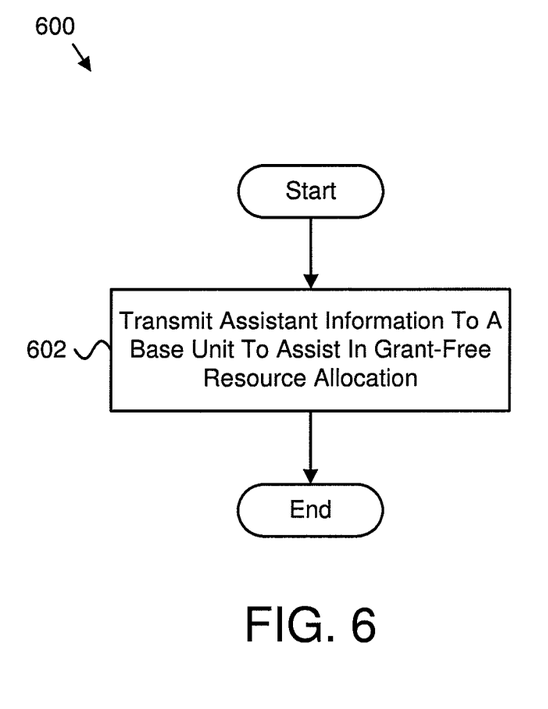
FIG. 6 is a schematic flow chart diagram illustrating one embodiment of a method for grant-free resource allocation.

FIG. 6 is a schematic flow chart diagram illustrating one embodiment of a method 600 for grant-free resource allocation. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 assistant information to a base unit 104 to assist in grant-free resource allocation.

In one embodiment, the assistant information includes an expected type of resource, a bit rate requirement, reliability information, or some combination thereof. In a further embodiment, the expected type of resource, the bit rate requirement, the reliability information, or some combination thereof is based on an amount of traffic in a cellular network. In certain embodiments, the expected type of resource, the bit rate requirement, the reliability information, or some combination thereof is based on a remote unit 102.

In various embodiments, the expected type of resource is selected from the group including: a first resource type in which uplink data transmissions are made based on radio resource control signaling, without grant, and without physical layer signaling; a second resource type in which uplink data transmissions are made based on radio resource control signaling, without grant, and with physical layer signaling for activation, deactivation, or a combination thereof; and a third resource type in which uplink data transmissions are made based on radio resource control signaling, without grant, and with physical layer signaling for modifying at least one parameter. In some embodiments, the assistant information includes a delay, a bit rate requirement, reliability information, or some combination thereof. In one embodiment, the delay, the bit rate requirement, the reliability information, or some combination thereof is based on an amount of traffic in a cellular network. In a further embodiment, the delay, the bit rate requirement, the reliability information, or some combination thereof is based on a remote unit 102. In certain embodiments, the assistant information is based on an indicator transmitted from the base unit 104.

In various embodiments, the indicator indicates one or more types of grant-free transmissions supported by the base unit 104. In some embodiments, the indicator corresponds to all resource types. In one embodiment, the indicator corresponds to one resource type. In a further embodiment, the indicator is transmitted by radio resource control signaling.

In certain embodiments, the base unit 104 configures the grant-free resource allocation based on features of a remote unit 102. In various embodiments, the method 600 includes transmitting an indicator that indicates one or more types of grant-free transmissions supported by a remote unit 102. In some embodiments, the indicator corresponds to all resource types. In one embodiment, the indicator corresponds to one resource type. In certain embodiments, the indicator includes one bit and the one bit indicates whether the remote unit 102 supports one or more types of grant-free transmissions.

Figure 7:
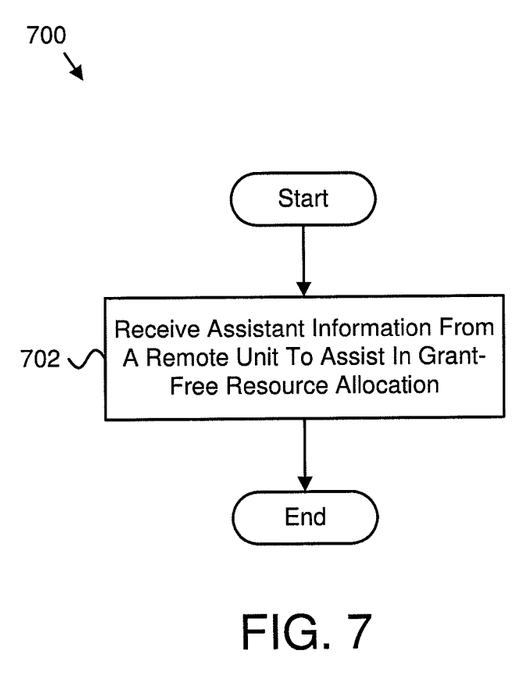
FIG. 7 is a schematic flow chart diagram illustrating another embodiment of a method for grant-free resource allocation.

FIG. 7 is a schematic flow chart diagram illustrating another embodiment of a method 700 for grant-free resource allocation. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include receiving 702 assistant information from a remote unit to assist in grant-free resource allocation.

In one embodiment, the assistant information includes an expected type of resource, a bit rate requirement, reliability information, or some combination thereof. In a further embodiment, the expected type of resource, the bit rate requirement, the reliability information, or some combination thereof is based on an amount of traffic in a cellular network. In certain embodiments, the expected type of resource, the bit rate requirement, the reliability information, or some combination thereof is based on a remote unit 102. In various embodiments, the expected type of resource is selected from the group including: a first resource type in which uplink data transmissions are made based on radio resource control signaling, without grant, and without physical layer signaling; a second resource type in which uplink data transmissions are made based on radio resource control signaling, without grant, and with physical layer signaling for activation, deactivation, or a combination thereof; and a third resource type in which uplink data transmissions are made based on radio resource control signaling, without grant, and with physical layer signaling for modifying at least one parameter. In some embodiments, the assistant information includes a delay, a bit rate requirement, reliability information, or some combination thereof. In one embodiment, the delay, the bit rate requirement, the reliability information, or some combination thereof is based on an amount of traffic in a cellular network.

In a further embodiment, the delay, the bit rate requirement, the reliability information, or some combination thereof is based on a remote unit 102. In certain embodiments, the assistant information is based on an indicator transmitted from a base unit 104. In various embodiments, the indicator indicates one or more types of grant-free transmissions supported by the base unit 104. In some embodiments, the indicator corresponds to all resource types. In some embodiments, the indicator corresponds to one resource type.

In certain embodiments, the indicator is transmitted by radio resource control signaling. In various embodiments, a base unit 104 configures the grant-free resource allocation based on features of the remote unit 102. In some embodiments, the method 700 includes receiving an indicator that indicates one or more types of grant-free transmissions supported by the remote unit 102. In certain embodiments, the indicator corresponds to all resource types. In some embodiments, the indicator corresponds to one resource type. In various embodiments, the indicator includes one bit and the one bit indicates whether the remote unit 102 supports one or more types of grant-free transmissions.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment, the method comprising:
    transmitting assistant information to a base unit to assist in grant-free resource allocation; and receiving a configuration of the grant-free resource allocation based on features of the user equipment;
wherein the assistant information comprises an indicator that indicates one or more types of grant-free transmissions supported by the user equipment, wherein the indicator is transmitted before the base unit allocates the grant-free resources and the indicator:
  corresponds to all grant-free resource types;
  corresponds to one grant-free resource type;
  comprises one bit and the one bit indicates whether the user equipment supports one or more types of grant-free transmissions; or
  some combination thereof, and wherein the one or more types of grant-free transmissions supported by the user equipment is selected from the group consisting of:
    a first resource type in which uplink data transmissions are made based on radio resource control signaling, without grant, and without physical layer signaling;
    a second resource type in which uplink data transmissions are made based on radio resource control signaling, without grant, and with physical layer signaling for activation of the uplink data transmissions, deactivation of the uplink data transmissions, or a combination thereof; and
    a third resource type in which uplink data transmissions are made based on radio resource control signaling, without grant, and with physical layer signaling for modifying at least one parameter corresponding to the uplink data transmissions.

2. The method of claim 1, wherein the assistant information comprises an expected type of resource, a bit rate requirement, reliability information, or some combination thereof.

3. The method of claim 2, wherein the expected type of resource, the bit rate requirement, the reliability information, or some combination thereof is based on:
  an amount of traffic in a cellular network;
  a remote unit; or
  a combination thereof.

4. The method of claim 2, wherein the expected type of resource is selected from the group consisting of:
  the first resource type;
  the second resource type; and
  the third resource type.

5. The method of claim 1, wherein the assistant information comprises a delay, a bit rate requirement, reliability information, or some combination thereof, wherein the delay, the bit rate requirement, the reliability information, or some combination thereof is based on:
  an amount of traffic in a cellular network;
  a remote unit; or
  a combination thereof.

6. The method of claim 1, wherein the assistant information is based on a second indicator transmitted from the base unit.

7. The method of claim 6, wherein the second indicator indicates one or more types of grant-free transmissions supported by the base unit, wherein the second indicator:
  corresponds to all grant-free resource types;
  corresponds to one grant-free resource type;
  is transmitted by radio resource control signaling; or
  some combination thereof.

8. An apparatus comprising a user equipment, the apparatus further comprising:
  a transmitter that transmits assistant information to a base unit to assist in grant-free resource allocation; and
  a processor that receives a configuration of the grant-free resource allocation based on features of the user equipment, wherein:
  the assistant information comprises an indicator that indicates one or more types of grant-free transmissions supported by the user equipment, wherein the indicator is transmitted before the base unit allocates the grant-free resources and the indicator:
    corresponds to all grant-free resource types;
    corresponds to one grant-free resource type;
    comprises one bit and the one bit indicates whether the user equipment supports one or more types of grant-free transmissions; or
    some combination thereof, and wherein the one or more types of grant-free transmissions supported by the user equipment is selected from the group consisting of:
      a first resource type in which uplink data transmissions are made based on radio resource control signaling, without grant, and without physical layer signaling;
      a second resource type in which uplink data transmissions are made based on radio resource control signaling, without grant, and with physical layer signaling for activation of the uplink data transmissions, deactivation of the uplink data transmissions, or a combination thereof; and
      a third resource type in which uplink data transmissions are made based on radio resource control signaling, without grant, and with physical layer signaling for modifying at least one parameter corresponding to the uplink data transmissions.

9. A method of a base unit, the method comprising:
receiving assistant information from a remote unit to assist in grant-free resource allocation, wherein the grant-free resource allocation is based on features of the remote unit;
wherein the assistant information comprises an indicator that indicates one or more types of grant-free transmissions supported by the remote unit, wherein the indicator is received before the base unit allocates the grant-free resources and the indicator:
  corresponds to all grant-free resource types;
  corresponds to one grant-free resource type;
  comprises one bit and the one bit indicates whether the remote unit supports one or more types of grant-free transmissions; or
  some combination thereof, and wherein the one or more types of grant-free transmissions supported by the remote unit is selected from the group consisting of:
    a first resource type in which uplink data transmissions are made based on radio resource control signaling, without grant, and without physical layer signaling;
    a second resource type in which uplink data transmissions are made based on radio resource control signaling, without grant, and with physical layer signaling for activation of the uplink data transmissions, deactivation of the uplink data transmissions, or a combination thereof; and
    a third resource type in which uplink data transmissions are made based on radio resource control signaling, without grant, and with physical layer signaling for modifying at least one parameter corresponding to the uplink data transmissions.

10. The method of claim 9, wherein the assistant information comprises an expected type of resource, a bit rate requirement, reliability information, or some combination thereof.

11. The method of claim 10, wherein the expected type of resource, the bit rate requirement, the reliability information, or some combination thereof is based on:
   an amount of traffic in a cellular network;
   a remote unit; or
   a combination thereof.

12. The method of claim 10, wherein the expected type of resource is selected from the group consisting of:
   the first resource type;
   the second resource type; and
   the third resource type.

13. The method of claim 9, wherein the assistant information comprises a delay, a bit rate requirement, reliability information, or some combination thereof, wherein the delay, the bit rate requirement, the reliability information, or some combination thereof is based on:
   an amount of traffic in a cellular network;
   a remote unit; or
   a combination thereof.

14. The method of claim 9, wherein the assistant information is based on a second indicator transmitted from a base unit.

15. The method of claim 14, wherein the second indicator indicates one or more types of grant-free transmissions supported by the base unit, wherein the second indicator:
   corresponds to all grant-free resource types;
   corresponds to one grant-free resource type;
   is transmitted by radio resource control signaling; or
   some combination thereof.

16. An apparatus comprising a base unit, the apparatus further comprising:
   a receiver that:
      receives assistant information from a remote unit to assist in grant-free resource allocation, wherein the grant-free resource allocation is based on features of the remote unit;
      wherein the assistant information comprises an indicator that indicates one or more types of grant-free transmissions supported by the remote unit, wherein the indicator is received before the base unit allocates the grant-free resources and the indicator:
         corresponds to all grant-free resource types;
         corresponds to one grant-free resource type;
         comprises one bit and the one bit indicates whether the remote unit supports one or more types of grant-free transmissions; or
      some combination thereof, and wherein the one or more types of grant-free transmissions supported by the remote unit is selected from the group consisting of:
         a first resource type in which uplink data transmissions are made based on radio resource control signaling, without grant, and without physical layer signaling;
         a second resource type in which uplink data transmissions are made based on radio resource control signaling, without grant, and with physical layer signaling for activation of the uplink data transmissions, deactivation of the uplink data transmissions, or a combination thereof; and
         a third resource type in which uplink data transmissions are made based on radio resource control signaling, without grant, and with physical layer signaling for modifying at least one parameter corresponding to the uplink data transmissions.

* * * * *